United States Patent
Heart et al.

(10) Patent No.: US 11,983,288 B1
(45) Date of Patent: May 14, 2024

(54) OPERATING SYSTEM ENHANCEMENTS TO PREVENT SURREPTITIOUS ACCESS TO USER DATA FILES

(71) Applicant: Secure Computing, LLC, Forest Park, IL (US)

(72) Inventors: Karen Heart, Forest Park, IL (US); Alexander Rasin, Chicago, IL (US)

(73) Assignee: Secure Computing, LLC, Forest Park, IL (US)

( * ) Notice: Subject to any disclaimer, the term of this patent is extended or adjusted under 35 U.S.C. 154(b) by 407 days.

(21) Appl. No.: 17/555,265

(22) Filed: Dec. 17, 2021

Related U.S. Application Data

(60) Provisional application No. 63/276,546, filed on Nov. 5, 2021.

(51) Int. Cl.
*G06F 21/62* (2013.01)

(52) U.S. Cl.
CPC .................. *G06F 21/6218* (2013.01)

(58) Field of Classification Search
CPC .................................................. G06F 21/6128
See application file for complete search history.

(56) References Cited

U.S. PATENT DOCUMENTS

| | | | |
|---|---|---|---|
| 6,336,175 B1 | 1/2002 | Shaath et al. | |
| 7,814,554 B1 * | 10/2010 | Ragner | G06F 21/52 713/193 |
| 8,387,047 B1 * | 2/2013 | Mazin | G06F 9/445 718/1 |
| 8,484,734 B1 * | 7/2013 | Tsai | G06F 21/564 726/24 |
| 8,613,045 B1 * | 12/2013 | Shigapov | H04L 63/10 726/28 |
| 10,127,318 B2 * | 11/2018 | Chakra | G06F 16/9566 |
| 10,628,560 B1 * | 4/2020 | Siranni | G06F 21/6281 |
| 11,775,866 B2 * | 10/2023 | Paterson | G06F 16/313 707/829 |
| 11,822,699 B1 * | 11/2023 | Heart | G06F 21/6227 |

(Continued)

OTHER PUBLICATIONS

Song Sanggeun, The Effective Ransomware Prevention Technique Using Process Monitoring on Android Platform, Mobile Information Systems, 2016, vol. 2016, arn: 2946735, ISSN: 1574-017X, E-ISSN: 1875-905X, DOI: 10.1155/2016/2946735, 1 pg.

(Continued)

*Primary Examiner* — Gary S Gracia

(57) ABSTRACT

A method prevents unauthorized access to user data files on a computing device. The device receives a request from an application to open a data file (including file name path). The device determines whether the path corresponds to a designated storage location for user data files and determines whether access to the data file has previously been granted for the application. When the file is a user file with no permission for the application, the device uses a volition table to determine whether access volition has been asserted for the data file by the application within a preceding predefined period of time. When access volition has been asserted, the device permits the application to access the data file. When access volition has not been asserted, the device displays a user interface box prompting a user to decide whether or not to grant the application access to the data file.

21 Claims, 12 Drawing Sheets

(56) References Cited

U.S. PATENT DOCUMENTS

| | | |
|---|---|---|
| 2002/0033838 A1 | 3/2002 | Krueger et al. |
| 2005/0033975 A1 | 2/2005 | Lahti et al. |
| 2006/0041942 A1 | 2/2006 | Edwards |
| 2006/0136446 A1* | 6/2006 | Hughes .................. G06F 16/10 |
| 2006/0272021 A1 | 11/2006 | Marinescu et al. |
| 2007/0157287 A1 | 7/2007 | Lim |
| 2008/0209551 A1 | 8/2008 | Treacy et al. |
| 2008/0229428 A1 | 9/2008 | Camiel |
| 2009/0193074 A1* | 7/2009 | Lee ........................ H04L 63/12 |
| | | 709/229 |
| 2010/0154038 A1* | 6/2010 | Natarajan ............... G06F 21/62 |
| | | 726/5 |
| 2010/0211879 A1* | 8/2010 | Tsao ................... H04L 67/1097 |
| | | 715/810 |
| 2014/0137252 A1 | 5/2014 | Zheng et al. |
| 2015/0058286 A1* | 2/2015 | Leibovici ............. G06F 9/5055 |
| | | 707/610 |
| 2015/0113655 A1* | 4/2015 | Strahm ................. G06F 3/0605 |
| | | 726/25 |
| 2017/0090699 A1* | 3/2017 | Pennington ............. G06F 16/44 |
| 2017/0104599 A1* | 4/2017 | Ali ............................ H04L 9/14 |
| 2017/0206371 A1* | 7/2017 | Kim ....................... G06F 16/93 |
| 2018/0129821 A1* | 5/2018 | Havewala ............. G06F 3/0664 |
| 2018/0144124 A1* | 5/2018 | Lahav ................... H04L 9/3242 |
| 2018/0181723 A1* | 6/2018 | von Muhlen ........... H04L 67/06 |
| 2019/0228153 A1* | 7/2019 | Scaife ................. G06F 21/6218 |
| 2019/0332783 A1* | 10/2019 | Bhardwaj ............. G06F 21/645 |
| 2022/0027110 A1* | 1/2022 | Abe ...................... G06F 3/1232 |
| 2022/0358216 A1* | 11/2022 | Qi .......................... G06F 21/554 |
| 2023/0161824 A1* | 5/2023 | Pandit ................... G06T 19/003 |
| | | 707/769 |
| 2023/0244389 A1* | 8/2023 | Dai ........................ G06F 3/067 |
| | | 711/163 |

OTHER PUBLICATIONS

Wang Kang, File hiding based on capacity disguise and double file system, Journal of Computer Applications (Apr. 10, 2016), vol. 36, No. 4, pp. 979-984, CODEN: JYIIDU, ISSN: 1001-9081, 1 pg.

* cited by examiner

Enhanced File Access

OPERATING SYSTEM ENHANCEMENTS TO PREVENT SURREPTITIOUS ACCESS TO USER DATA FILES

CROSS REFERENCE TO RELATED APPLICATIONS

This application claims priority to U.S. Provisional Patent Application No. 63/276,546, filed Nov. 5, 2021, entitled "Operating System Enhancements to Prevent Surreptitious Access to User Data Files," which is incorporated by reference herein in its entirety.

TECHNICAL FIELD

The disclosed embodiments relate generally to computer security and more specifically to systems, methods, and user interfaces that prevent or limit malware access to user data fields

BACKGROUND

There are many forms of malware. In some cases, malware modifies data on a user's computer, takes over a user's computer (e.g., to carry out further nefarious activity), or locks a user out of the user's computer entirely (e.g., ransomware). In other cases, the malware just "looks" at user data files (e.g., spreadsheets or text documents). In this way, the malware can steal valuable information (e.g., financial information or proprietary business information), and the user may not even know the information was taken.

SUMMARY

Almost invariably, users interact with some GUI element on a computer screen prior to opening or deleting of a file. This interaction strongly indicates the volition of the user to open or delete the designated file. Accordingly, this volition information can be harnessed by the operating system to guard against secret attempts to open or delete files by malware. Malware typically lacks the ability to interact with GUI elements prior to an attempt to open a file.

Disclosed embodiments improve the protection of files from malicious activity by malware. In accordance with some embodiments, several software modules are added to the distribution of an operating system. A user can obtain this protection by a single update to the operating system.

A "user file" or "user data file" is any non-executable data file that a user knowingly and intentionally accesses for the purpose of creating, revising, or viewing data contained within the file. Common examples of user files include word processor files (e.g., files with a .docx extension) and spreadsheet files (e.g., files with a .xlsx extension). On the other hand, application data files are data files that applications access directly to store and retrieve data for use by the application. For example, the dictionary files that a word processor uses to spell check a user document are application data files. In order to protect user files, disclosed embodiments prevent the opening and deleting of user files in the absence of explicit user volition. The same general principle does not apply to application data files, however, because applications routinely revise and remove their application data files during operation in order to facilitate their functionality. Instead, guarding of application data files should entail protection from access or deletion by unrelated applications, unless explicit user volition for the action is present.

In some embodiments, identification of files as user files or application data files depends on the location where a file is located within the file system. As a general rule, current operating systems advocate the storage of user files in a different area of the file system than application data files. The root path for the area where user files are stored is specified by the operating system, although users are not prevented from storing their user files in other locations. Application data files characteristically are stored in a special area of the file system that is associated with the relevant application. Nonetheless, computer operating systems do not commonly enforce "sandboxing." That is, operating systems generally do not require separation of files and imposition of constraints. Because of this, current operating systems do not guarantee the location of application data files relative to their applications, even though they customarily follow a general pattern.

In some embodiments, the default path for user files is used as the root path of the locations where user files are stored. However, a supplied utility permits users to easily designate one or more root paths for locations of their files. In order to guarantee the location of application data files, primitive sandboxing is generally added to the operating system. Although sandboxing of application data files may be achieved in a variety of ways, the following description shows how some embodiments achieve this result.

In accordance with some embodiments, a method executes at an electronic device with a display. For example, the electronic device can be a smart phone, a tablet, a notebook computer, or a desktop computer. The method prevents unauthorized access to user data files. The device receives a request from an application to open a data file, the request including a name of the data file and a path to the data file. The device determines whether the path corresponds to a designated storage location for user data files and determines whether access to the data file has previously been granted for the application. When (i) the path corresponds to a designated storage location for user data files and (ii) access to the data file has not previously been granted for the application, the device accesses an operating system volition table to determine whether access volition has been asserted. Access volition has been asserted when the volition table includes a record for a volition assertion for the data file by the application within a preceding predefined period of time (e.g., less than five seconds, or less than one second). When access volition has been asserted, the device permits the application to access the data file. When access volition has not been asserted, the device displays a user interface box prompting a user of the computing device to decide whether or not to grant the application access to the data file.

In some embodiments, a computing device includes one or more processors, memory, a display, and one or more programs stored in the memory. The programs are configured for execution by the one or more processors. The one or more programs include instructions for performing any of the methods described herein.

In some embodiments, a non-transitory computer readable storage medium stores one or more programs configured for execution by a computing device having one or more processors, memory, and a display. The one or more programs include instructions for performing any of the methods described herein.

Thus methods, systems, and graphical user interfaces are disclosed that prevent unauthorized access to user data files.

BRIEF DESCRIPTION OF THE DRAWINGS

For a better understanding of the aforementioned systems, methods, and graphical user interfaces, as well as additional systems, methods, and graphical user interfaces that prevent unauthorized access to user data files, reference should be made to the Description of Embodiments below, in conjunction with the following drawings in which like reference numerals refer to corresponding parts throughout the figures.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

Figure 1:
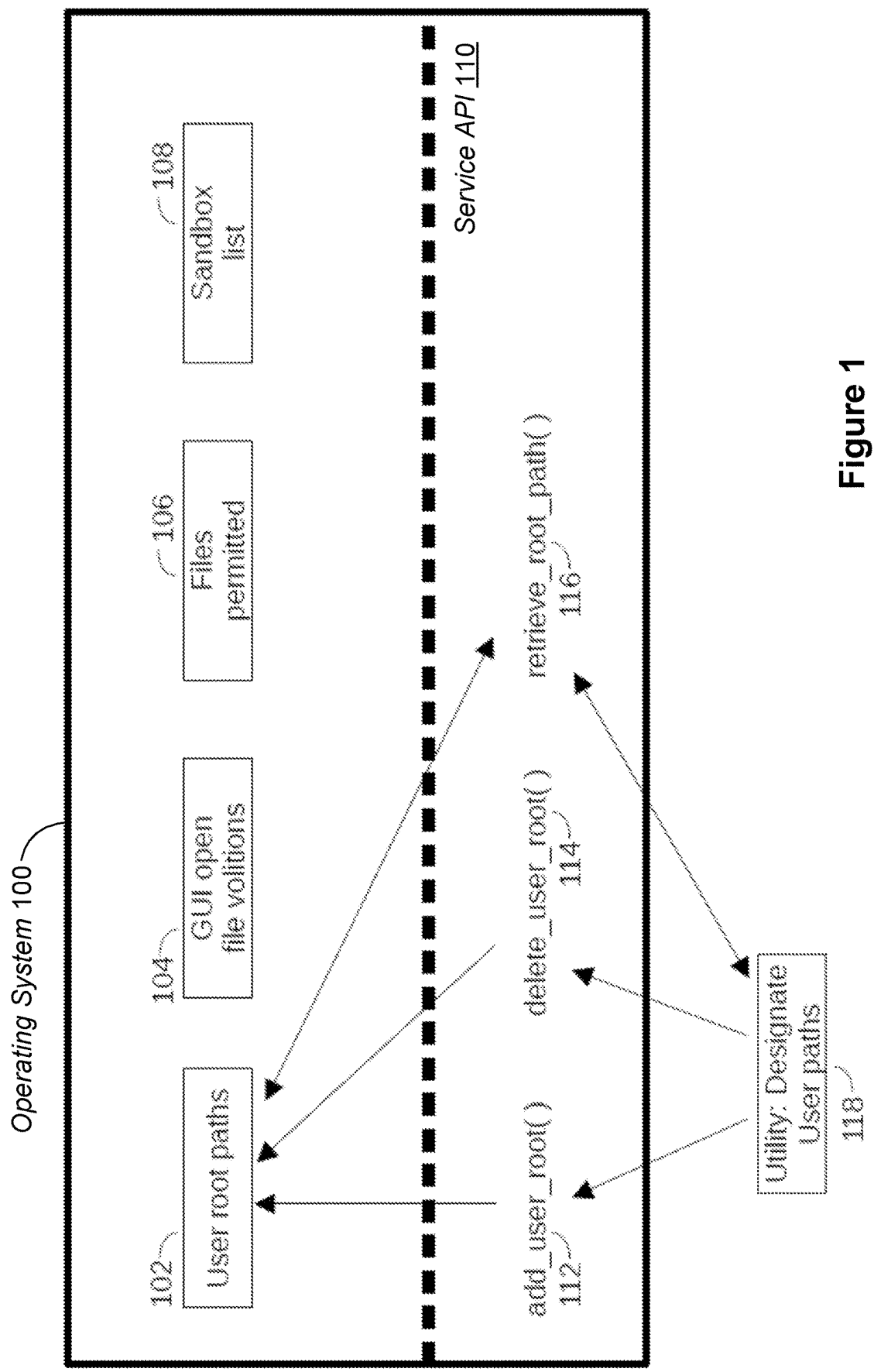
FIGS. 1-8 illustrate an operating system and some of the tables and functions used to prevent unauthorized file access, in accordance with some embodiments.

Initially, an area of storage that is accessible only by the kernel is set up within the operating system 100 in FIG. 1 for four tables of information. The User root paths table 102 in FIG. 1 stores the directory paths where subdirectories containing user files are stored. When the operating system 100 is updated, a default root path is stored in the path table 102, based on the particular operating system. Storage space is allocated for GUI open file volitions table 104 in FIG. 1 but no entries are added at the time of installation. Storage space is allocated for the Files permitted table 106 in FIG. 1 and, again, no entries are added at the time of installation. Storage for Sandbox list 108 in FIG. 1 is also allocated. The sandbox list 108 stores sandbox records. Each sandbox record includes the internal identifier of an application and the filesystem path where data files associated with the application are stored.

The installation also includes several new operating system functions, accessed through the Service API 110 in FIG. 1, to manage and utilize these tables. The functions add_user_root( ) 112 and delete_user_root( ) 114 add and remove root paths in the User root paths table 102. The function retrieve_root_path( ) 116 retrieves root paths stored in User root paths table 102. A utility called "Designate User Paths" 118 in FIG. 1 is also added with the installation. This utility, which may call the functions add_user_root( ) 112, delete_user_root( ) 114, and retrieve_root_path( ) 116, provides an opportunity for the user to manage the path table 102 by viewing, adding, and removing the root paths.

Calls to the add_user_root( ) 112 and delete_user_root( ) 114 functions are limited to the Utility 118. There are a variety of means to prevent other programs from calling these system functions. In some embodiments, a capability is added to the system that permits a program to call the add_user_root( ) 112 and delete_user_root( ) 114 functions. This capability, controlled by the kernel, is afforded to the utility 118 but no other programs. Hence, malware lacks the capability to remove or revise the user root paths stored in path table 102.

Figure 2:
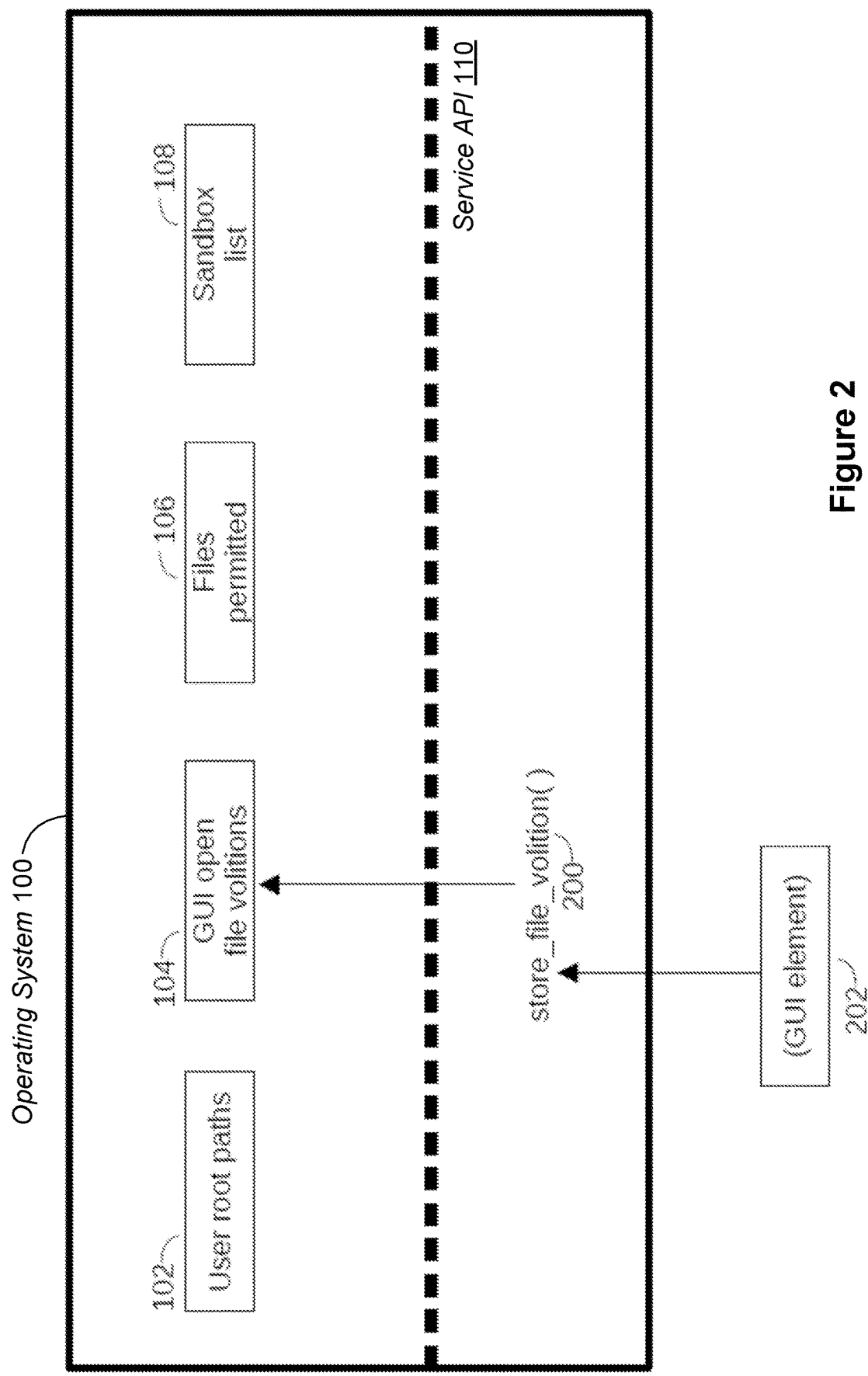

The operating system update also includes a store_file_volition( ) function 200, as shown in FIG. 2. This function stores information about a particular file that the user wishes to be opened by a particular application in GUI open file volitions table 104 (also referred to as the "Volition Table"). A user volition is derived from user interaction with one of a variety of Graphical User Interface (GUI) elements present on the computer screen. When a GUI element 202 calls the store_file_volition( ) function 200, the element passes two pieces of data. Specifically, the call passes the file path, which is simply the name and location of the file, and the name of the application that the user wishes to use to open the file. In turn, the store_file_volition( ) 200 function creates a data record (in the volition table 104) of the file path, the time when the function was called, and the name of the application associated with opening the file. The store_file_volition( ) 200 function inserts the data record into the GUI open file volitions table 104.

Figure 3:
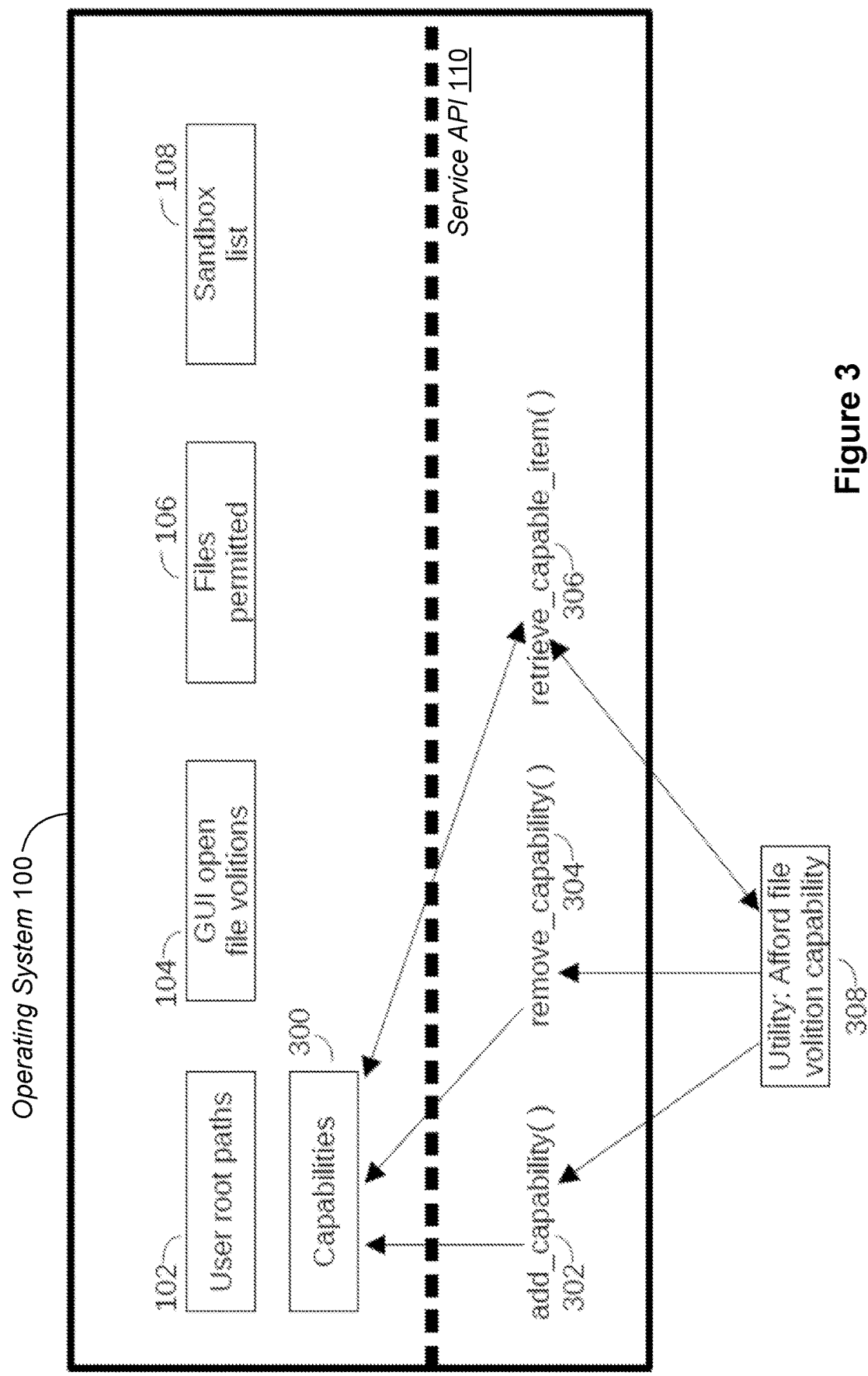

In order to regulate which GUI elements may call the store_file_volition( ) function 200, operating system protection is added. There are a variety of means to restrict which programs may call the store_file_volition( ) function 200. In some embodiments, additional capabilities and a utility are added. The first capability is simply the ability to call the store_file_volition( ) function 200. The remaining capabilities involve managing the first capability. All of these capabilities are stored where the operating system regularly maintains capabilities, designated in FIG. 3 as the Capabilities table 300. Management of the first capability involves three new system functions: the add_capability( ) function 302, the remove_capability( ) function 304, and the retrieve_capable_item( ) function 306. The capability utility 308 is a graphical application that is constructed to permit users to directly manage the capability to call the store_file_volition( ) function 200. The Capability Utility 308 manages this capability by calling the functions add_capability( ) 302, remove_capability( ) 304, and retrieve_capable_item( ) 306. Capabilities are also added to the Capability table 300 to afford only utility 308 the capability to call these functions. Consequently, malware lacks the capability to grant itself the ability to call the store_file_volition( ) function 200.

Figure 4:
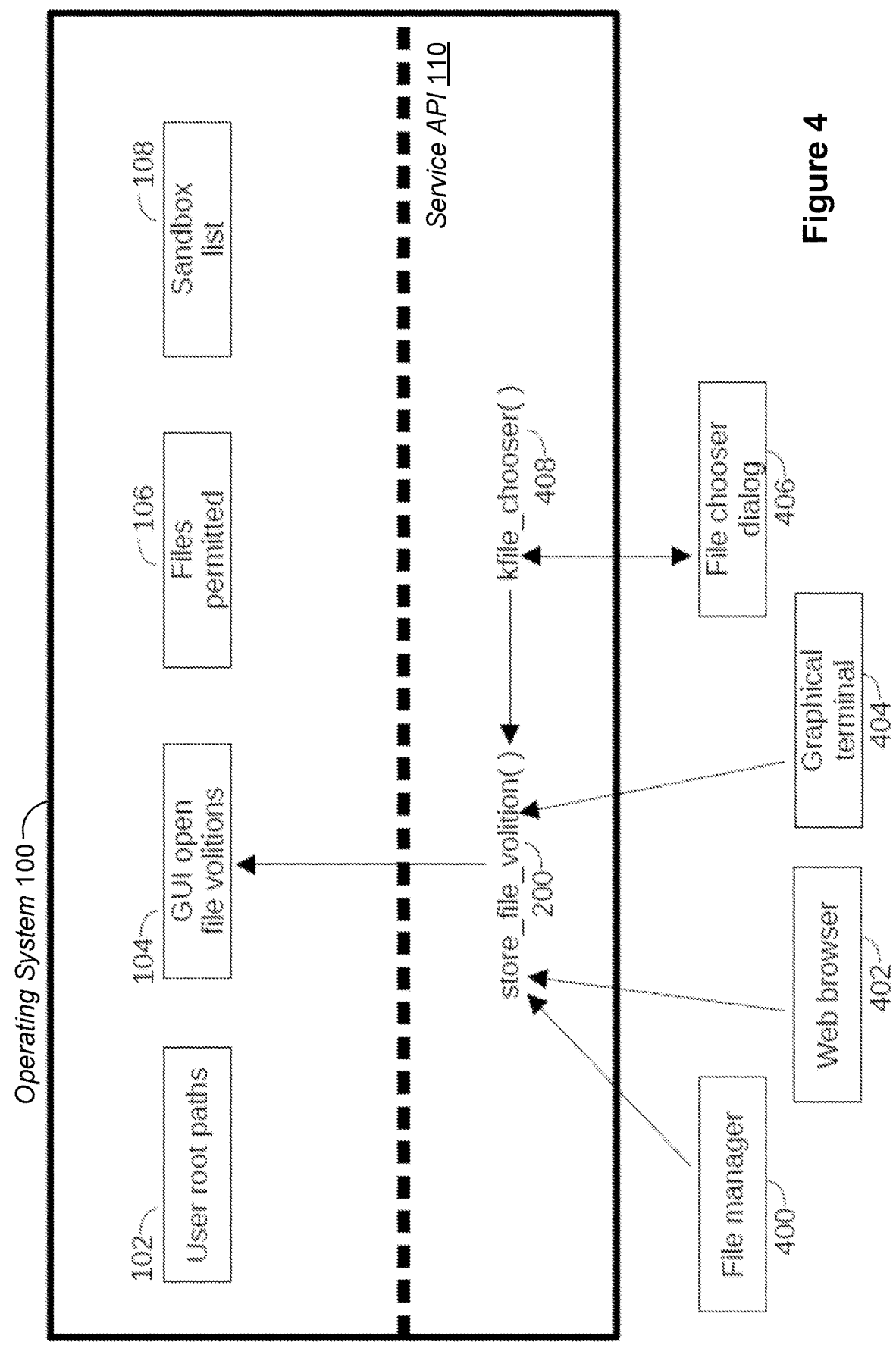

By default, several GUI elements that are distributed with the operating system are afforded the capability to call the store_file_volition( ) function 200. In particular, the file manager 400 and a default web browser 402 in FIG. 4 will be afforded the capability to call the store_file_volition( ) function 200. Additionally, the graphical command line program 404, commonly called the terminal program, is also afforded the capability. Notably, the terminal program is used to pass commands to various command line shell programs that are usually included in the operating system distribution. Although the terminal program 404 itself is afforded the capability to call the store_file_volition( ) function 200, the various command line shell programs are not. Also, GUI toolkits supplied with operating systems all contain a function already that creates such a file chooser dialog box 406. The update includes a kfile_chooser( ) function 408. This function 408 creates an ordinary modal file chooser dialog box 406, but it has also been granted the capability to call the store_file_volition( ) function 200. As part of the update, the GUI toolkit's ordinary file chooser dialog box function is remapped to call the kfile_chooser( ) function 408. Notably, the file chooser dialog box function typically supplied permits a user to specify the name of an existing file to open for reading and writing, as well as the name for a new file that is being saved.

Figure 5:
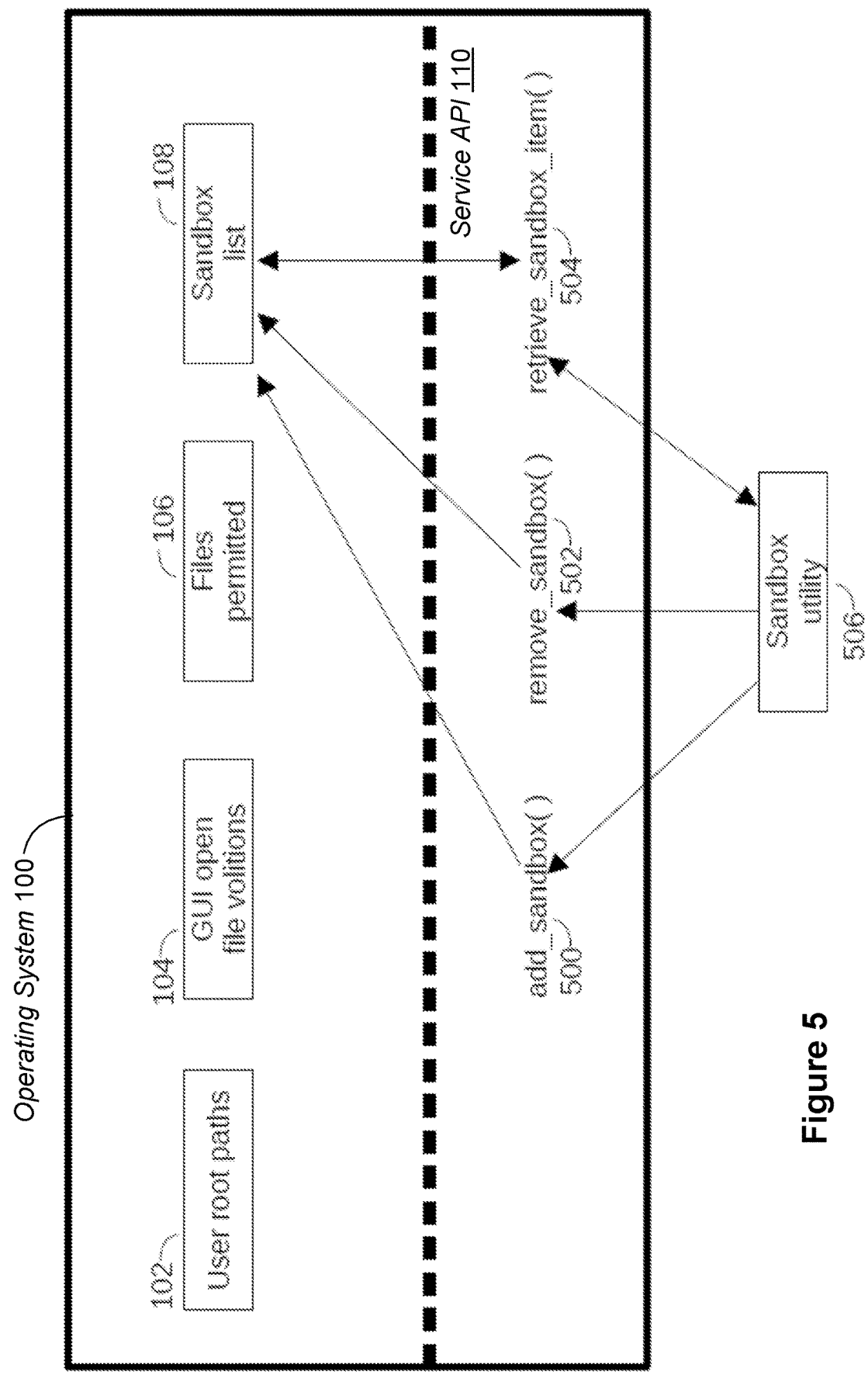

The functions add_sandbox( ) 500, remove_sandbox( ) 502, and retrieve_sandbox_item( ) 504 are added in FIG. 5 to manage the Sandbox list 108. A Graphical Sandbox utility 506 calls these functions, thereby permitting users to directly manage the list of applications that are associated with sandboxes. Capabilities are added to the capabilities table 300 so that only the Sandbox utility 506 may call these functions.

Figure 6:
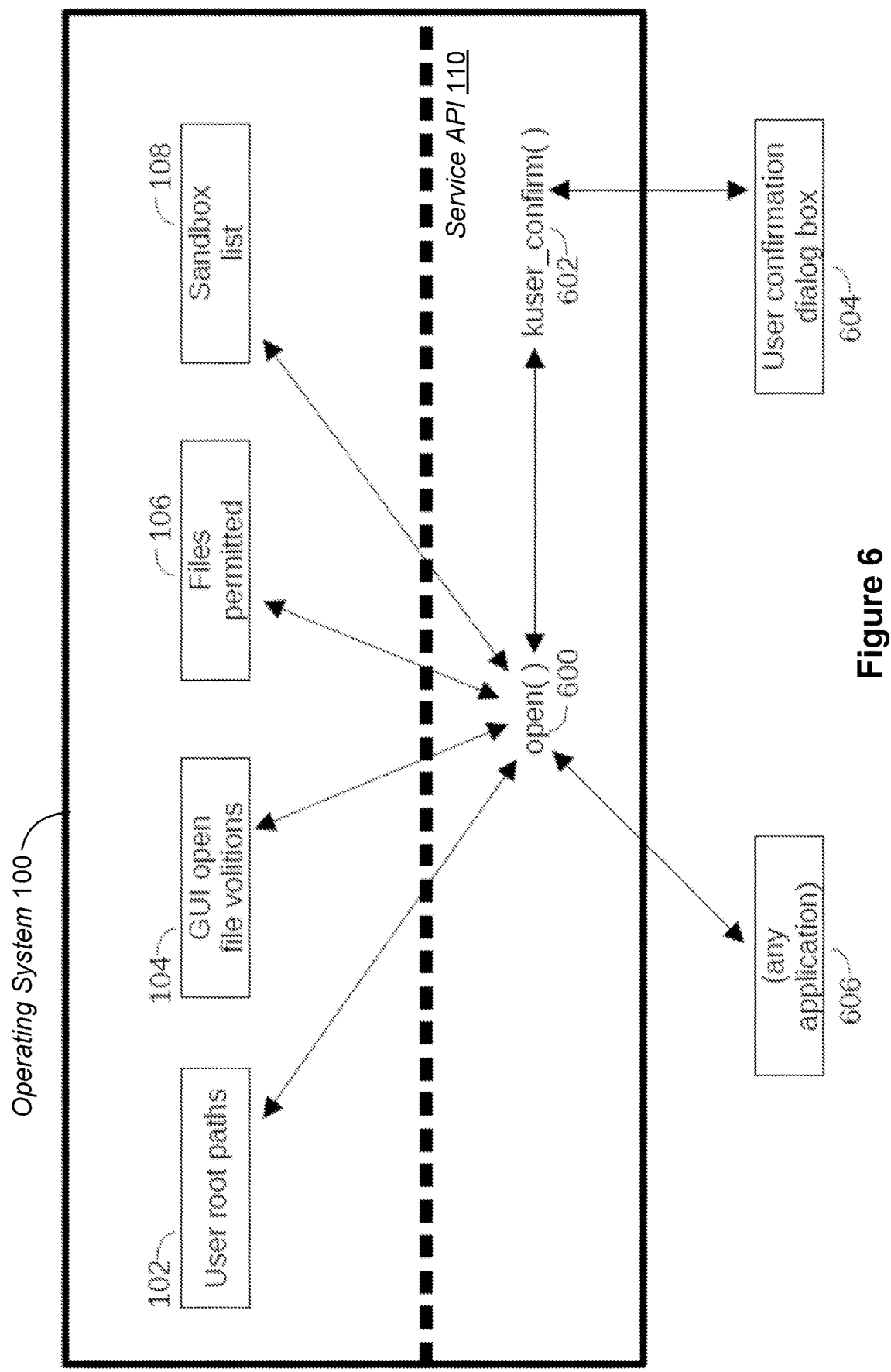

The enhanced operating system also includes a revised version of the typical file open( ) function 600, as illustrated in FIG. 6. The enhanced operating system also includes a kuser_confirm( ) function 602, which creates User confirmation dialog box 604. The use of these additions is described below.

With all of the previously described components installed and the system initialized with respect to user root paths, the process for regulating the opening of files in order to prevent the surreptitious opening by malware involves the registering of user open file volitions in the volitions table 104, as described above, and a call to the system function to open a file. At any time though, an application 606 in FIG. 6 may attempt to open a file by calling the open function 600. Initially, the open function 600 queries the files permitted table 106 for a record indicating that the user has previously permitted the application 606 to open the named file. If such a record exists, then the open( ) function 600 continues normally (i.e., the file is opened, without further processing).

If no such record exists, the open( ) function 600 retrieves the paths stored in user root paths table 102 to determine whether the file path matches or is a subset of a root path stored in path table 102. If the test succeeds, the file is considered to be a user file. If no match is found, the file is considered an application data file. In the case of an application data file, the open( ) function 600 retrieves from Sandbox list 108 the sandbox record associated with application 606. If the file path matches or is a subset of the filesystem path stored in the sandbox record, then the file is related to the application and open( ) function 600 proceeds normally. Otherwise, the open function 600 queries the GUI open file volitions table 104 for a timely entry that matches the name of application 606 and the file path. Timeliness of entries in table 104 is determined by the difference between the time that the open( ) function 600 is called and the time that the data record in the GUI open file volitions table 104 was created. By default, records that are less than 5 seconds old are considered timely and all others are considered expired (and may be removed during the query). Other embodiments use different lengths of time to judge timeliness (e.g., less than one second or less than two seconds) The amount of time that is used as the benchmark for timeliness may be configured within certain limits by the user via a utility supplied with the operating system. If such a timely entry is found, the open( ) function 600 creates a new data record, consisting of the application name and the internal identifier for the file path, and adds the record to the files permitted table 106. Thereafter, the open( ) function 600 proceeds normally. If no such entry is found in table 104, the open( ) function 600 calls the kuser_confirm( ) function 602, which creates a user confirmation dialog box 604. The dialog box 604 contains a stern warning that a program that is trying to access a file is likely malware and asks the user if the application 606 may open the named file. If the user indicates in the affirmative, such as by clicking on a "Yes" button on the dialog box 604, then the open( ) function 600 adds the data record to the file permitted table 106, as described before, and proceeds normally. If the user indicates negatively, such as by clicking on a "No" button on the dialog box 604, then the open( ) function 600 terminates immediately, returning an error message to application 606. In some embodiments, negative decisions are recorded so that repeated attempts by malware do not require user input to reject every time.

With the enhanced operating system deployed, malware will attempt to open a file without the ability to first use a GUI element, such as the File manager 400, the Web browser 402, the Graphical terminal 404, or the File chooser dialog box 406. Accordingly, no record relating to that file and the malware application will exist in either the GUI open file volitions table 104 or the Files permitted table 106, thereby triggering the display of the User confirmation dialog box 604. Thus, the User confirmation dialog box 604 will appear almost exclusively when malware is attempting to open a file secretly. Moreover, malware that the user has not explicitly added to the sandbox list will lack the ability to open files without first seeking permission via the dialog box 604.

A similar mechanism is used to protect files from being deleted surreptitiously. Deletion specifically refers to the removal of the file node from the file system, as opposed to the removal of all file content, which is accomplished by calling the open( ) function 600 with the truncation flag. The operating system function responsible for deleting files from the file system is revised so that it does not perform its function unless requested by the user or the associated application. One means for achieving this end is to revise the existing system function so that it may not delete user files, although it will still be permitted to delete application data files. An internal version of the function is created for use with the file manager distributed with the operating system, which is the GUI component relied upon primarily by users for deleting their files.

Figure 7:
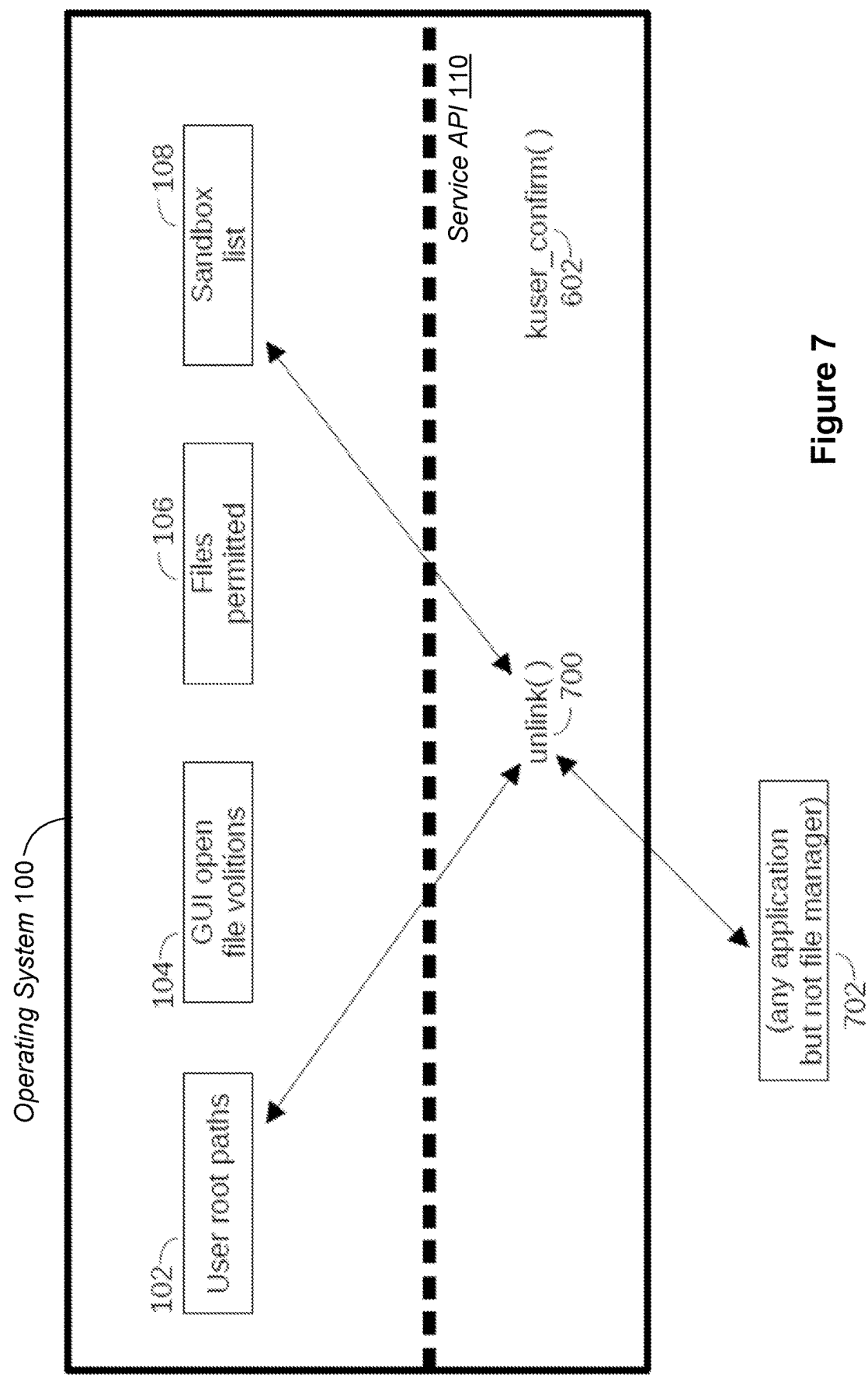

For example, in the Linux operating system, the system function responsible for deleting files is named unlink, noted by the unlink( ) function 700 in FIG. 7. When any application other than the file manager 702 calls the unlink( ) function 700, the unlink( ) function 700 retrieves paths from user root paths table 102 to determine whether the file is a user file or an application data file. If the file is a user data file, the unlink( ) function 700 merely returns an error message to the calling application 702. If the file is an application data file, the unlink( ) function 700 retrieves from the Sandbox list 108 the sandbox record associated with the application 702. If the file path matches or is a subset of the filesystem path stored in the sandbox record, the file is related to the application and the unlink( ) function 700 proceeds normally. Otherwise, it returns error message to the application 702.

Figure 8:
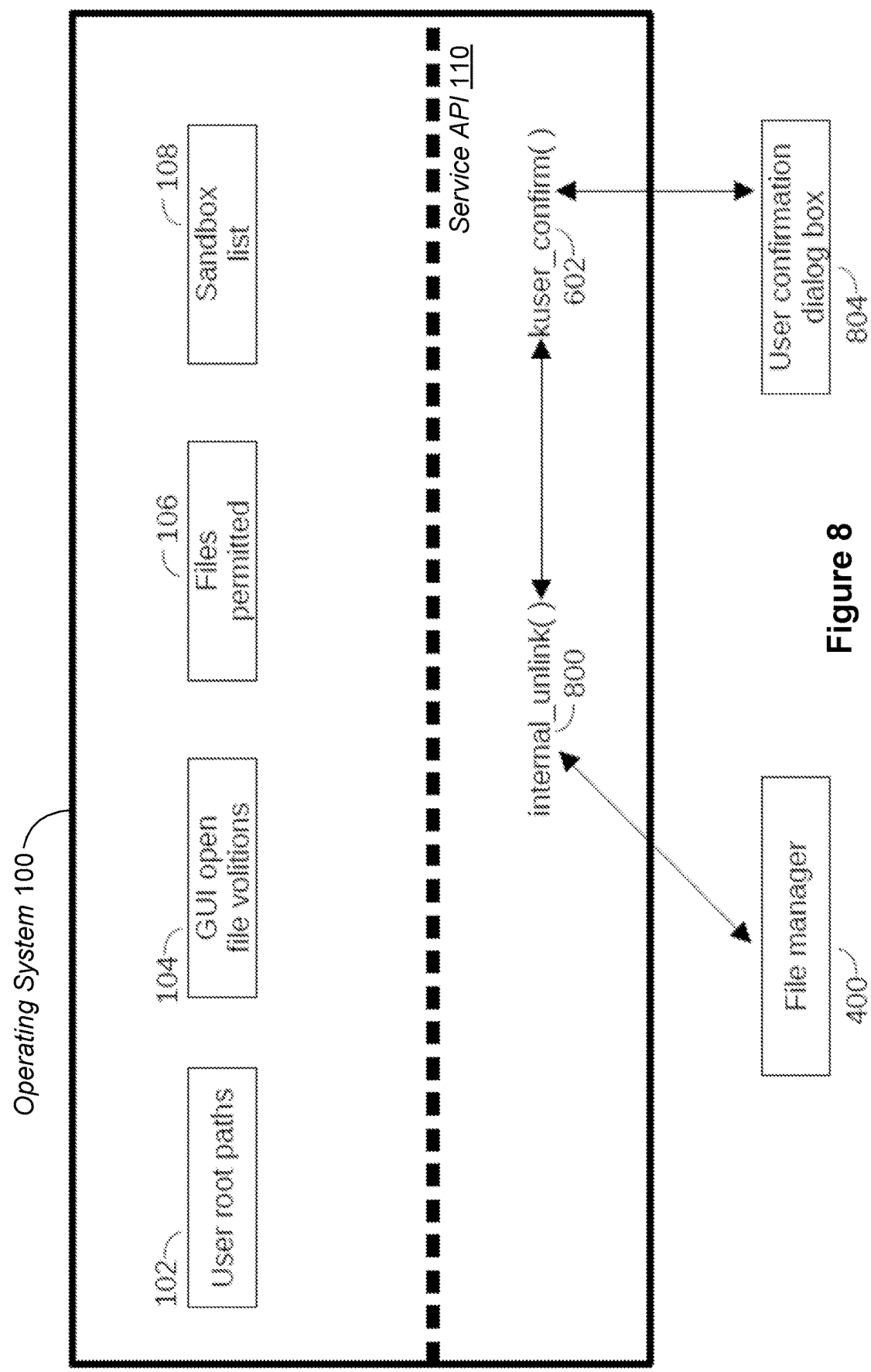

The new internal version of the unlink( ) function 700 is the internal_unlink( ) function 800, as shown in FIG. 8. The internal_unlink( ) function 800 is created with the same function prototype as the unlink( ) function, so that it receives the path of the file to be deleted as a parameter. The internal_unlink( ) function 800 calls the kuser_confirm( ) function 602, which displays the User confirmation dialog box 804. The dialog box 804 displays a standard message asking whether the user wishes to delete the designated file. Notably, users are accustomed to seeing such a request for confirmation when deleting files using a file manager. The dialog box 804 returns the user's response to the internal_unlink function 800, which deletes the file if the user confirmed the action.

If malware could call the internal_unlink( ) function 800, the User confirmation dialog box 804 would appear and, perhaps, cause confusion. A careless user may well click on the "Ok" button simply to avoid further inconvenience, not realizing that the request was generated by malware. Accordingly, the internal_unlink( ) function 800 is protected from being called by malware. There are various ways to prevent malware from calling this function. In some embodiments, a capability to call the function is created in the kernel of Operating System 100 and afforded to the file manager program 400 that is distributed with the operating system. No other program is afforded this capability. Accordingly, malware is prevented from calling the internal_unlink( ) function 800.

Figure 9A:
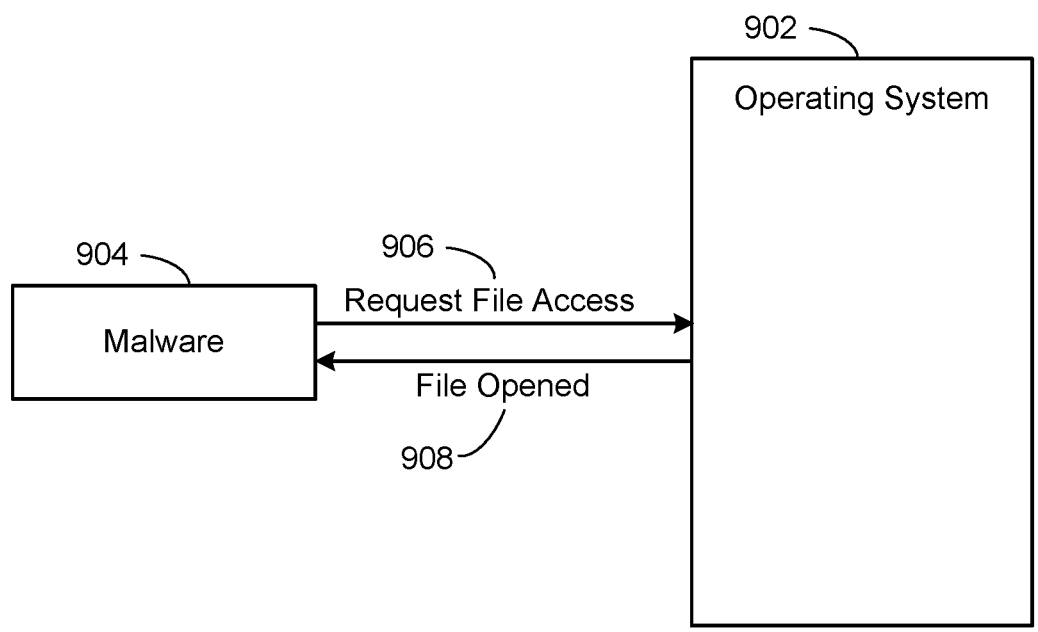
FIG. 9A illustrates typical file access, in accordance with some embodiments.

FIG. 9A shows typical file access. An application (including malware 904), can request 906 access to a file from the operating system 902. In general, the file is opened 908, unless the requested file is a system file. In this way, malware 904 can gain access to user data files without a user's knowledge or permission.

Figure 9B:
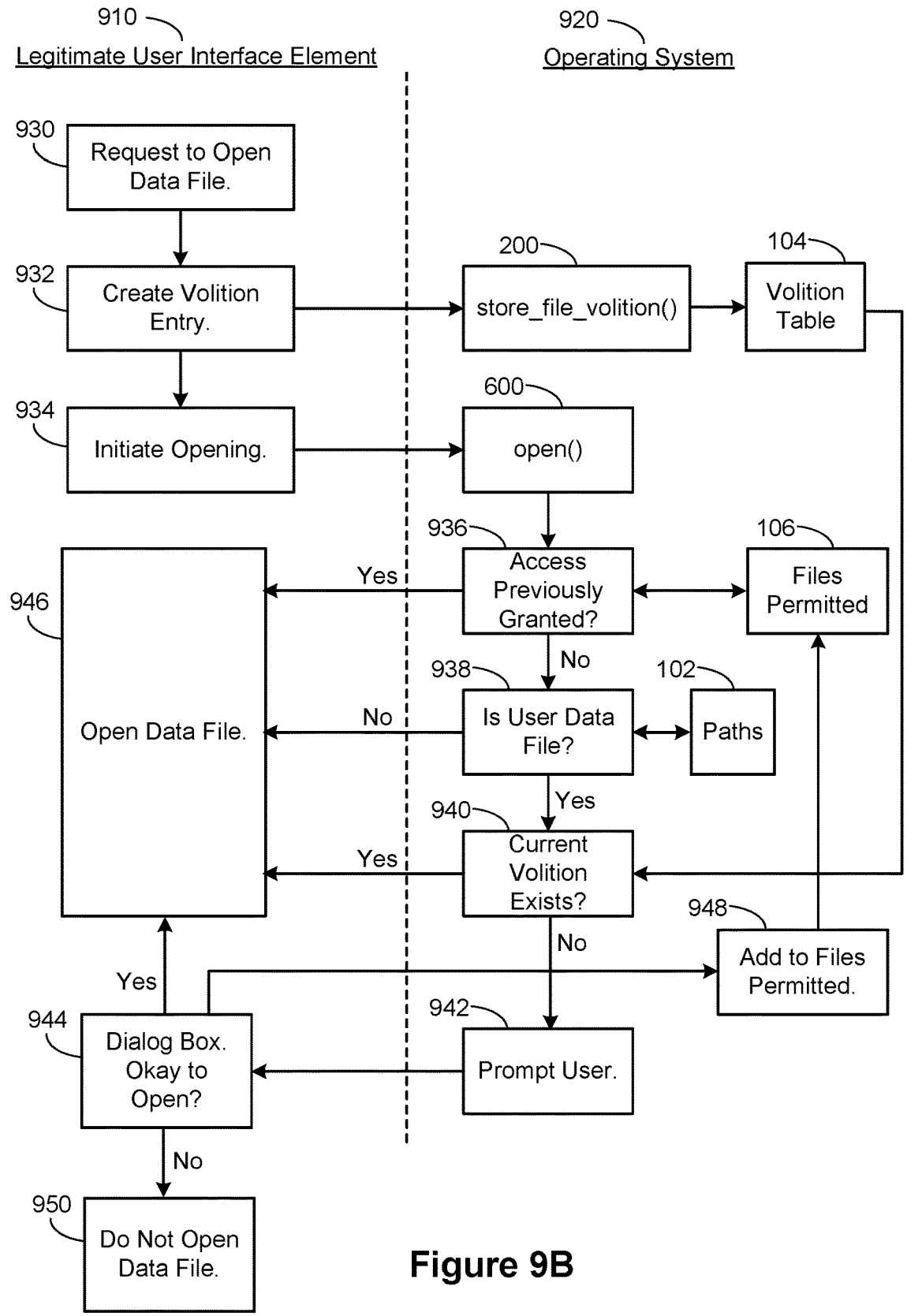
FIGS. 9B and 9C illustrate file access with the enhanced features of disclosed embodiments.
Figure 9C:
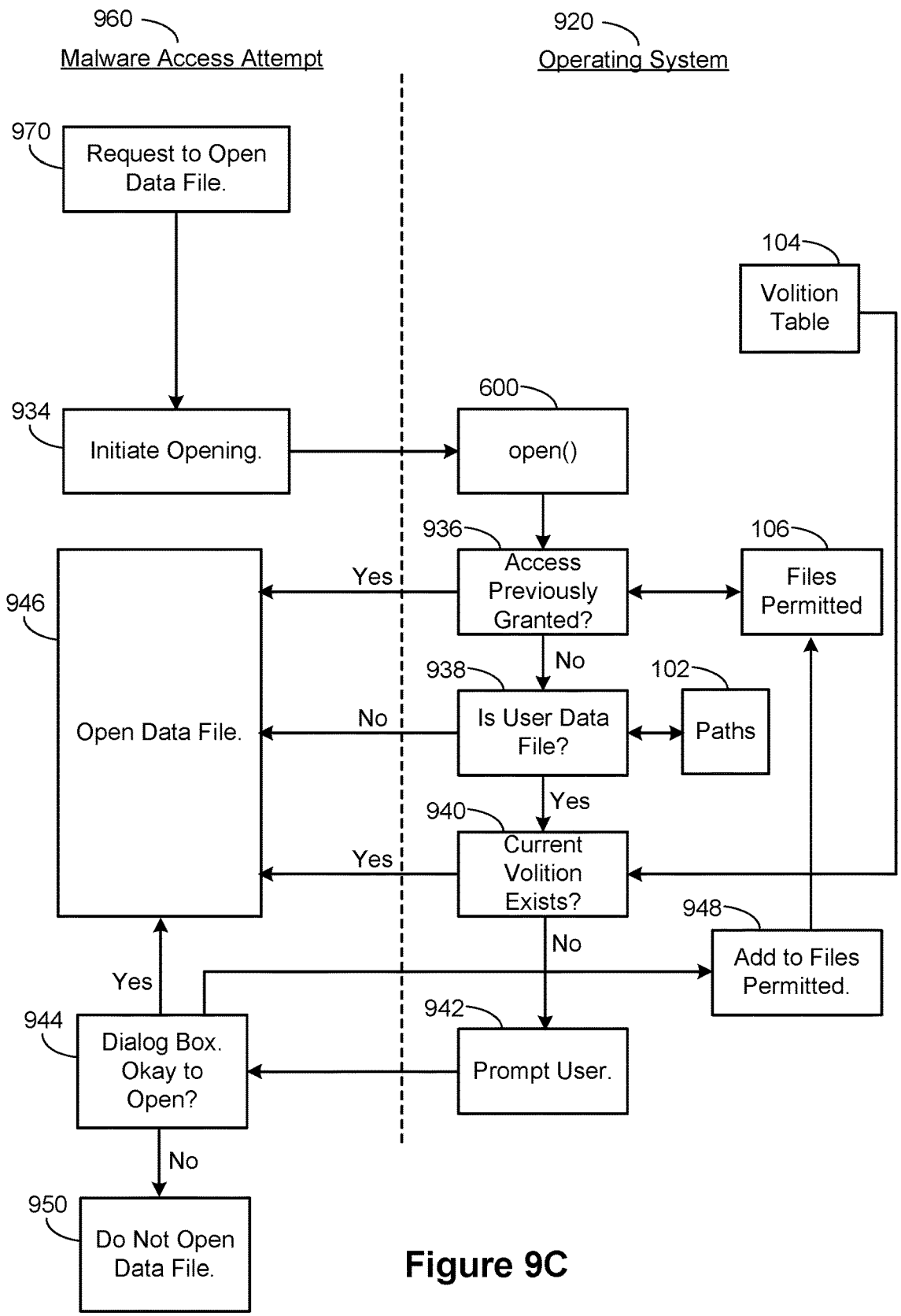

FIGS. 9B and 9C illustrate enhanced file access in accordance with some embodiments. In these two figures, the left side illustrates the actions of a user and/or an application. The right hand side illustrates operations and tables within the operating system.

In FIG. 9B, a legitimate user interface element 910 is accessed by a user, and needs to open a data file. At this stage, it is not known whether it is a user data file or an application data file. The application begins (930) a request to open the data file. Coming from a legitimate user interface element, the application calls (932) the store_file_volition( ) function 200 in the operating system 920, which adds the volition to the volition table 104. The data stored includes the name and path of the data file, the application indicating the volition to open the file, and a timestamp of when the function was called. Subsequently, the user interface element 910 initiates (934) opening the data file by calling the open( ) function 600. The open( ) function 600 performs a sequence of operations. First, the open( ) function 600 checks (936) whether the specified application has already been granted access to the specified data file. This determination is made using the files permitted table 106. If permission has already been granted, the data file is opened (946). If permission has not already been granted, the open( ) function 600 determines (938) whether the data file is a user data file or an application data file. In some embodiments, the open( ) function makes this determination using a paths table 102. Because the disclosed embodiments are focused on protecting user data, access to application data files does not utilize volitions. In some embodiments (not illustrated in FIG. 9B), there is a further test by checking the sandbox list 108 to determine whether the data file is an application data file for the specific application making the request (e.g., one application can't modify the application files of another application).

If the data file is a user data file, the open( ) function proceeds to the next test, which is to check (940) for volitions. If there is a timely volition in the volition table 104 for the data file/application combination, then the open( ) function 600 proceeds to open (946) the file. If not, there is a good chance it is malware attempting to open the data file, so the open( ) function 600 prompts (942) the user for a decision (e.g., a dialog box), which determines (944) whether it is okay to open the data file. If the user says "no," the file is not opened (950). In some embodiments, when a user says no, the operating system records the denial of access for the data file/application combination, so that the user does not have to deal with repeated attempts at access. In some embodiments, the denials are stored in the Files permitted table 106 (specifying that access is not permitted). If the user grants access for the application to open the data file, the data file/application is added (948) to the files permitted table 106 and the data file is opened (946).

FIG. 9C is essentially the same as FIG. 9B, except that opening the data file is initiated (970) by a malware program 960. Because the malware program 960 has no access to the store_file_volition( ) function 200, that portion of FIG. 9B is omitted in FIG. 9C. Because of that, if the process flow reaches box 940 (checking for a current volition), it will necessarily fail, and therefore prompt the user to decide whether to open the file.

Figure 10:
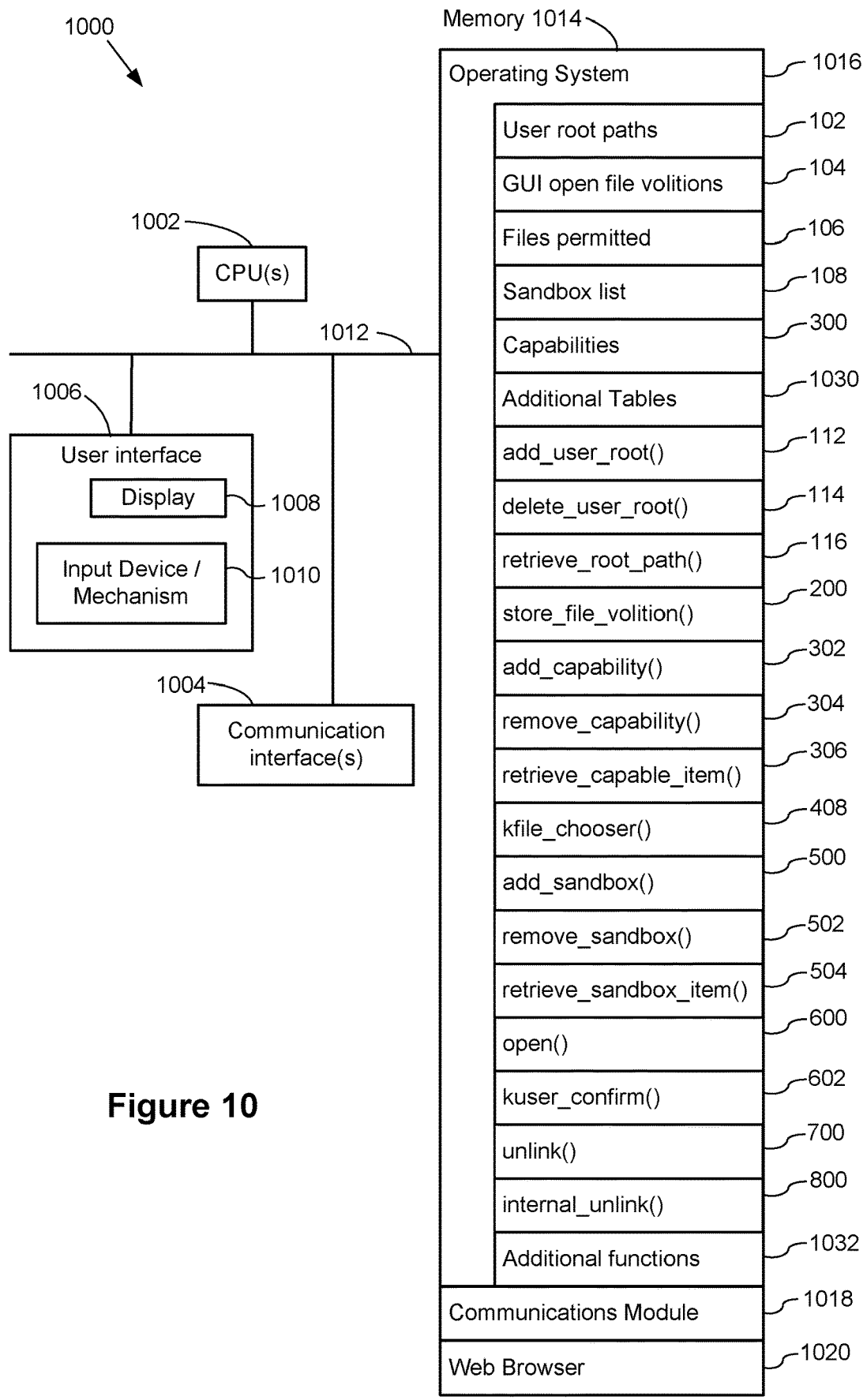
FIG. 10 is a block diagram of a computing device according to some embodiments.

FIG. 10 is a block diagram illustrating a computing device 1000 in accordance with some embodiments. Various examples of the computing device 1000 include a desktop computer, a laptop computer, a tablet computer, and other computing devices. The computing device 1000 typically includes one or more processing units/cores (CPUs) 1002 for executing modules, programs, and/or instructions stored in the memory 1014 and thereby performing processing operations; one or more network or other communications interfaces 1004; memory 1014; and one or more communication buses 1012 for interconnecting these components. The communication buses 1012 may include circuitry that interconnects and controls communications between system components.

The computing device 1000 includes a user interface 1006 comprising a display device 1008 and one or more input devices or mechanisms 1010. In some embodiments, the input device/mechanism includes a keyboard. In some embodiments, the input device/mechanism includes a "soft" keyboard, which is displayed as needed on the display device 1008, enabling a user to "press keys" that appear on the display 1008. In some embodiments, the display 1008 and input device/mechanism 1010 comprise a touch screen display (also called a touch sensitive display).

In some embodiments, the memory 1014 includes high-speed random access memory, such as DRAM, SRAM, DDR RAM or other random access solid state memory devices. In some embodiments, the memory 1014 includes non-volatile memory, such as one or more magnetic disk storage devices, optical disk storage devices, flash memory devices, or other non-volatile solid state storage devices. In some embodiments, the memory 1014 includes one or more storage devices remotely located from the CPU(s) 1002. The memory 1014, or alternatively the non-volatile memory devices within the memory 1014, comprises a non-transitory computer readable storage medium. In some embodiments, the memory 1014, or the computer readable storage medium of the memory 1014, stores the following programs, modules, and data structures, or a subset thereof:

- an operating system 1016, which includes procedures for handling various basic system services and for performing hardware dependent tasks. As described above, embodiments include one or more tables, including a table of user root paths 102, a file volitions table 104, a permitted files table 106, a sandbox list 108, and a table of capabilities 300. Some embodiments include additional tables 1030. As described above, the operating system 1016 also includes a set of functions and procedures, which are part of the service API 110. Some embodiments include additional functions 1032 not described above;
- a communications module 1018, which is used for connecting the computing device 1000 to other computers and devices via the one or more communication network interfaces 1004 (wired or wireless) and one or more communication networks, such as the Internet, other wide area networks, local area networks, metropolitan area networks, and so on; and a web browser 1020 (or other application capable of displaying web pages), which enables a user to communicate over a network with remote computers or devices.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 1014 stores a subset of the modules and data structures identified above. Furthermore, the memory 1014 may store additional modules or data structures not described above.

Although FIG. 10 shows a computing device 1000, FIG. 10 is intended more as a functional description of the various features that may be present rather than as a structural schematic of the embodiments described herein. In practice, and as recognized by those of ordinary skill in the art, items shown separately could be combined and some items could be separated.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of preventing unauthorized access to user data files, performed at a computing device having one or more processors and memory storing one or more programs configured for execution by the one or more processors, the method comprising:
  receiving a request from an application to open a data file, the request including a name of the data file and a path to the data file;
  in response to receiving the request:
    determining whether the path corresponds to a designated storage location for user data files;
    determining whether access to the data file has previously been granted for the application;
    in accordance with a determination that (i) the path corresponds to a designated storage location for user data files and (ii) access to the data file has not previously been granted for the application:
      accessing an operating system volition table to determine whether access volition has been asserted, wherein access volition has been asserted when the volition table includes a record for a volition assertion for the data file by the application within a preceding predefined period of time;
      in accordance with a determination that access volition has been asserted, permitting the application to access the data file; and
      in accordance with a determination that access volition has not been asserted, displaying a user interface box prompting a user of the computing device to decide whether or not to grant the application access to the data file.

2. The method of claim 1, further comprising, prior to receiving the request from the application to open the data file, receiving a volition request, including the name of the data file and the path to the data file; and
  in response to the volition request and a determination that the application has permission to make volition requests, storing a record in the volition table, the record including (i) the name of the data file, (ii) the path to the data file, (iii) an identifier of the application, and (iv) a current operating system timestamp.

3. The method of claim 1, wherein access volition has been asserted when the volition table includes a record (i) whose data file name, path, and application match the data file name, path, and application specified in the request and (ii) whose timestamp $T_S$ satisfies $T_C - T_S < \Delta t$, where $T_C$ is a current timestamp at the computing device and $\Delta t$ is the predefined period of time.

4. The method of claim 1, wherein determining whether access to the data file has previously been granted for the application comprises searching for a record in a permitted files table that matches the name of the data file, the path of the data file, and an identifier of the application.

5. The method of claim 4, further comprising, in accordance with a determination that access volition has been asserted, storing a new record in the permitted files table, the new record including the name of the data file, the path of the data file, and an identifier of the application.

6. The method of claim 1, further comprising, after displaying the user interface box:
  receiving input, from a user of the computing device, granting permission to access the data file; and
  in response to receiving the user input:
    opening the data file; and
    storing a new record in a permitted files table, the new record including the name of the data file, the path of the data file, and an identifier of the application.

7. The method of claim 1, further comprising, after displaying the user interface box:
  receiving input, from a user of the computing device, denying permission to access the data file; and
  in response to receiving the user input:
    not opening the data file; and
    storing a new record in a permitted files table, the new record including the name of the data file, the path of the data file, an identifier of the application, and an access flag indicating access is denied.

8. The method of claim 1, further comprising, in response to the request, determining whether access to the data file has previously been denied for the application.

9. The method of claim 8, wherein (i) determining whether access to the data file has previously been granted for the application and (ii) determining whether access to the data file has previously been denied for the application are performed simultaneously by looking up a record in a permitted files table and, if found, reading an access flag on the record that specifies whether access is granted or denied.

10. The method of claim 8, wherein determining that access to the data file has not previously been granted for the application includes determining that access to the data file has not previously been denied to the application.

11. A computing device, comprising:
one or more processors;
memory;
a display; and
one or more programs stored in the memory and configured for execution by the one or more processors, the one or more programs comprising instructions for:
receiving a request from an application to open a data file, the request including a name of the data file and a path to the data file;
in response to receiving the request:
determining whether the path corresponds to a designated storage location for user data files;
determining whether access to the data file has previously been granted for the application;
in accordance with a determination that (i) the path corresponds to a designated storage location for user data files and (ii) access to the data file has not previously been granted for the application:
accessing an operating system volition table to determine whether access volition has been asserted, wherein access volition has been asserted when the volition table includes a record for a volition assertion for the data file by the application within a preceding predefined period of time;
in accordance with a determination that access volition has been asserted, permitting the application to access the data file; and
in accordance with a determination that access volition has not been asserted, displaying a user interface box prompting a user of the computing device to decide whether or not to grant the application access to the data file.

12. The computing device of claim 11, wherein the one or more programs further comprise instructions for, prior to receiving the request from the application to open the data file, receiving a volition request, including the name of the data file and the path to the data file; and
in response to the volition request and a determination that the application has permission to make volition requests, storing a record in the volition table, the record including (i) the name of the data file, (ii) the path to the data file, (iii) an identifier of the application, and (iv) a current operating system timestamp.

13. The computing device of claim 11, wherein access volition has been asserted when the volition table includes a record (i) whose data file name, path, and application match the data file name, path, and application specified in the request and (ii) whose timestamp $T_S$ satisfies $T_C - T_S < \Delta t$, where $T_C$ is a current timestamp at the computing device and $\Delta t$ is the predefined period of time.

14. The computing device of claim 11, wherein determining whether access to the data file has previously been granted for the application comprises searching for a record in a permitted files table that matches the name of the data file, the path of the data file, and an identifier of the application.

15. The computing device of claim 14, wherein the one or more programs further comprise instructions for, in accordance with a determination that access volition has been asserted, storing a new record in the permitted files table, the new record including the name of the data file, the path of the data file, and an identifier of the application.

16. The computing device of claim 11, wherein the one or more programs further comprise instructions for, after displaying the user interface box:
receiving input, from a user of the computing device, granting permission to access the data file; and
in response to receiving the user input:
opening the data file; and
storing a new record in a permitted files table, the new record including the name of the data file, the path of the data file, and an identifier of the application.

17. The computing device of claim 11, wherein the one or more programs further comprise instructions for, after displaying the user interface box:
receiving input, from a user of the computing device, denying permission to access the data file; and
in response to receiving the user input:
not opening the data file; and
storing a new record in a permitted files table, the new record including the name of the data file, the path of the data file, an identifier of the application, and an access flag indicating access is denied.

18. The computing device of claim 11, wherein the one or more programs further comprise instructions for, in response to the request, determining whether access to the data file has previously been denied for the application.

19. The computing device of claim 18, wherein (i) determining whether access to the data file has previously been granted for the application and (ii) determining whether access to the data file has previously been denied for the application are performed simultaneously by looking up a record in a permitted files table and, if found, reading an access flag on the record that specifies whether access is granted or denied.

20. The computing device of claim 11, wherein determining that access to the data file has not previously been granted for the application includes determining that access to the data file has not previously been denied to the application.

21. A non-transitory computer readable storage medium storing one or more programs configured for execution by a computing device having one or more processors, memory, and a display, the one or more programs comprising instructions for:
receiving a request from an application to open a data file, the request including a name of the data file and a path to the data file;
in response to receiving the request:
determining whether the path corresponds to a designated storage location for user data files;
determining whether access to the data file has previously been granted for the application;
in accordance with a determination that (i) the path corresponds to a designated storage location for user data files and (ii) access to the data file has not previously been granted for the application:
accessing an operating system volition table to determine whether access volition has been asserted, wherein access volition has been asserted when the volition table includes a record for a volition assertion for the data file by the application within a preceding predefined period of time;

in accordance with a determination that access volition has been asserted, permitting the application to access the data file; and in accordance with a determination that access volition has not been asserted, displaying a user interface box prompting a user of the computing device to decide whether or not to grant the application access to the data file.

\* \* \* \* \*